Patented Dec. 18, 1934

1,985,217

UNITED STATES PATENT OFFICE 1,985,217

SECONDARY-HEXYL ETHYL BARBITURIC ACID, AND ITS SALTS

Horace A. Shonle, Indianapolis, Ind., assignor to Eli Lilly and Company, Indianapolis, Ind., a corporation of Indiana No Drawing. Application February 18, 1932, Serial No. 593,871

7 Claims. (Cl. 260—33)

This application is a continuation in part of my co-pending application Serial No. 387,084, filed August 19, 1929.

It is the main object of my invention to produce certain 5,5-di-aliphatic-substituted barbituric acids, and their salts, in which one substituent is the ethyl group, and the other substituent is a secondary-hexyl radical in the group consisting of the following:

n-Butyl-methyl-carbinyl; n-Propyl-ethyl-carbinyl.

An incidental object of my invention is to produce certain new intermediates. These are di-aliphatic-substituted malonic esters.

The new 5,5-di-aliphatic-substituted barbituric acids and their salts which are included in this present application all have pronounced hynotic action. They are all represented by the following formula:

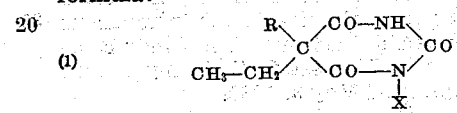

in which R represents a secondary-hexyl radical of the class consisting of the n-butyl-ethyl-carbinyl and n-propyl-ethyl-carbinyl groups; and X represents either hydrogen (if the compound is an acid), or either an alkali metal, such as sodium, or ammonium, or a mono-di-alkyl substituted ammonium, such as —NH$_3$—CH$_3$ or —NH$_2$(C$_2$H$_5$)$_2$, (if the compound is a salt).

These new acids and salts are prepared from certain new di-substituted malonic esters, usually ethyl esters, which are represented by the following formula:

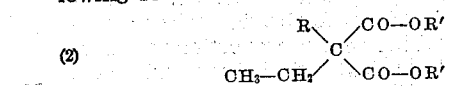

in which R, as before, represents a secondary-hexyl radical of the class consisting of the n-butyl-methyl-carbinyl and n-propyl-ethyl-carbinyl groups; and R' represents an alkyl radical having not to exceed 3 carbon atoms, namely the methyl, ethyl, and propyl radicals, and preferably the ethyl radical.

The new di-substituted malonic esters, barbituric acids, and barbiturates constitute a class the members of which have in common the radical

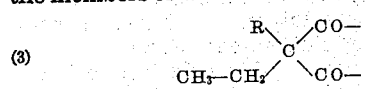

in which R, as already defined, represents a secondary-hexyl radical of the class consisting of the n-butyl-methyl-carbinyl and n-propyl-ethyl-carbinyl groups, and in which the two CO groups are joined to the chemical structure necessary to make the whole a compound of that class.

So far as I know, I am the first to produce any compound containing the radical shown in Formula 3.

Secondary-hexyl ethyl malonic esters 1. n-Butyl-methyl-carbinyl ethyl malonic ester is an example of these malonic esters. It may be prepared as follows: One mole of sodium is dissolved in 10 to 12 times its weight of absolute alcohol under a reflux condenser. One mole of ethyl malonic ester is added, and then 1.1 moles of 2-bromo-hexane are gradually added. The 2-bromo-hexane may be obtained in various ways, as by refluxing n-butyl-methyl carbinol with HBr or by treating n-butyl-methyl carbinol with dry gaseous HBr or with PBr$_3$. The mixture is refluxed for some hours or until it no longer shows an alkaline action to moist litmus. Most of the alcohol is removed by vacuum distillation, leaving an oily residue. Water is added to this residue to dissolve out the sodium bromide; and the oily layer, which is n-butyl-methyl-carbinyl ethyl malonic ester, is separated and dried. It is purified by fractional distillation in vacuo. When so purified, it is a colorless or pale yellow liquid, having a boiling point of between 120–128° C. at about 5½ mm. pressure, and a refractive index at 25° C. of between 1.4332 and 1.4366. It may be represented by the following formula:

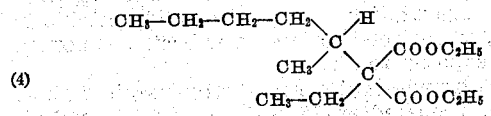

2. n-Propyl-ethyl-carbinyl ethyl malonic ester is another example. It may be prepared analogously to n-butyl-methyl-carbinyl ethyl malonic ester, using 3-bromo-hexane (obtained by treating n-propyl-ethyl carbinol with PBr$_3$). The 3-bromo-hexane so obtained boils at about 64–67° C., corrected, at 48–49 mm. pressure. n-Propyl-ethyl-carbinyl ethyl malonic ester is a colorless or pale yellow liquid when purified by fractional distillation, having a boiling point of about 132–135° C., corrected, at 8–10 mm. pressure, and a refractive index at 25° C. of about 1.4345–1.4369. It may be represented by the following formula:

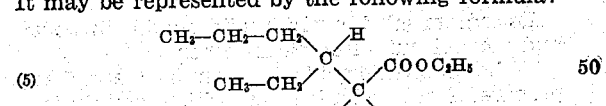

When n-butyl-methyl carbinol is treated with aqueous HBr, some 3-bromo-hexane is obtained in addition to the 2-bromo-hexane. Similarly, when n-propyl-ethyl carbinol is treated with aqueous HBr, some 2-bromo-hexane is obtained in addition to the 3-bromo-hexane. Thus in either case a mixture of isomers is obtained. In consequence the malonic esters obtained from these mixed bromides, and the barbituric acids obtained as described hereinafter from these malonic esters, would also be a mixture of the corresponding isomers. This is avoided by using either dry gaseous HBr or PBr3.

Better yields of the above esters are usually obtained if most of the alcohol that was used to dissolve the sodium is removed, as by vacuum distillation, prior to the addition of the bromohexane.

Secondary-hexyl ethyl barbituric acids

Di-substituted barbituric acids corresponding to the various di-substituted malonic esters above described may be obtained, as shown by the following examples:

1. n-Butyl-methyl-carbinyl ethyl barbituric acid may be prepared as follows: Three moles of sodium are dissolved in 10 to 12 times its weight of absolute alcohol under a reflux condenser. To this are added 1.6 moles of urea and one mole of n-butyl-methyl-carbinyl ethyl malonic ester. The mixture is gently refluxed for 12 to 15 hours, after which most of the alcohol is removed by vacuum distillation. The residue is dissolved in water, and a sufficient amount of dilute acid is added to completely precipitate the n-butyl-methyl-carbinyl ethyl barbituric acid. The precipitated barbituric acid is filtered off, dried, washed with gasoline, and purified by recrystallizing from dilute alcohol. It is a white chrystalline solid having a melting point of about 121–124° C., corrected. It is insoluble in water, readily soluble in alcohol and ether, and has a bitter taste. It may be represented by the following formula:

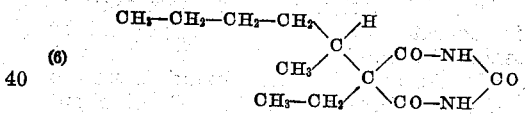

(6)

Its sodium salt is a white solid, soluble in water and alcohol but insoluble in ether. Its salts of ammonia, mono-methyl amine, and di-ethyl amine, are whitish or yellowish solids, soluble in water, which tend to lose their basic component when exposed to air.

2. n-Propyl-ethyl-carbinyl ethyl barbituric acid may be prepared analogously to n-butyl-methyl-carbinyl ethyl barbituric acid, using n-propyl-ethyl-carbinyl ethyl malonic ester. When purified by recrystallization from dilute alcohol it is a white crystalline solid melting at about 112–115° C., corrected. It is insoluble in water, soluble in alcohol and ether, and has a bitter taste. It may be represented by the following formula:

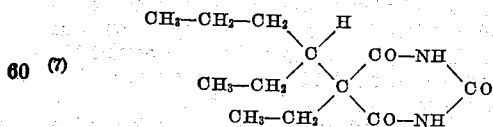

(7)

Its sodium salt is a white solid, soluble in water and alcohol but insoluble in ether.

If the barbituric acids of Formulas 6 and 7 are prepared from malonic esters which contain isomers as already described, the barbituric acids also contain corresponding isomers, and their melting points are in consequence somewhat lowered. But such mixtures of these isomeric barbituric acids are found to have substantially the same therapeutic effects as the separate acids.

Both of these di-substituted barbituric acids may be obtained upon purification as white crystalline solids, insoluble in water, and soluble in alcohol and ether; and both exhibit hypnotic properties.

Secondary-hexyl ethyl barbiturates

Both of the above-described barbituric acids are soluble in alkali-metal hydroxides and ethylates, to form the corresponding alkali-metal barbiturates in solution. The solid salts may be obtained from such solutions.

The new di-aliphatic-substituted barbiturates, which may both be represented by Formula 1 with X representing a metal, or ammonium, or an alkyl-substituted ammonium, can perhaps best be prepared from the corresponding di-aliphatic-substituted barbituric acids, as by reaction in a suitable solvent with either the hydroxide or the which may both be represented by Formula 1 with ammonia, or with the desired alkyl amine. For instance:

A. *Alkali-metal salts.*—A solution of one molar proportion of the hydroxide or the ethylate of the inorganic base, such as sodium if an alkali-metal salt is desired, is added to a suspension or solution in a suitable solvent (such as water, dilute alcohol, or absolute alcohol) of one molar proportion of either of the herein-contemplated 5,5-di-aliphatic-substituted barbituric acids, producing the desired barbiturate in solution. The amount of solvent used is desirably sufficient to dissolve the salt thus produced. The solution is filtered, and is then evaporated, preferably under vacuum at a low temperature, until the salt is obtained in solid form. If the salt is desired in a stable form sufficiently free from contaminants so that clear water solutions thereof suitable for intravenous injection may be obtained, such a salt may be so obtained by the method set forth in my Patent No. 1,856,792, granted May 3, 1932.

Examples under A

1. Sodium n-butyl-methyl-carbinyl ethyl barbiturate:

One part by weight of n-butyl-methyl-carbinyl ethyl barbituric acid is added to enough alcohol to facilitate handling. To this is added a solution of sodium hydroxide, preferably carbonate-free or substantially so, containing $$\frac{40}{240}$$

parts by weight of sodium hydroxide, which is the amount of sodium hydroxide necessary to combine in equal molecular proportions with the n-butyl-methyl-carbinyl ethyl barbituric acid. This solution is filtered clear, and is then evaporated under vacuum until the sodium n-butyl-methyl-carbinyl ethyl barbiturate separates out in solid form. The salt as thus obtained in solid form contains a varying amount of moisture.

If it is desired to have a stable salt substantially free from contaminants, the alcohol used for dissolving the barbituric acid is absolute alcohol, and the sodium hydroxide is added as a very concentrated aqueous solution so that the reaction which occurs to form the salt is in a substantially alcoholic solution. By having a substantially alcoholic solution, decomposition of the salt during the process of drying is effectively avoided; and the drying may be carried to a point where materially less than 1% of moisture remains, so that the salt is substantially anhydrous. In this way a stable salt substantially free from decomposition products formed during preparation or drying or on standing is obtained. This salt may be used safely for making aqueous solutions for intravenous injection; for such aqueous solutions, when freshly made, are clear solutions substantially free from haziness.

Sodium n-butyl-methyl-carbinyl ethyl barbiturate is a white solid, soluble in water and alcohol, and insoluble in ether. The salt is bitter tasting, and its aqueous solution is alkaline in reaction. It may be represented by the following formula:

(8) 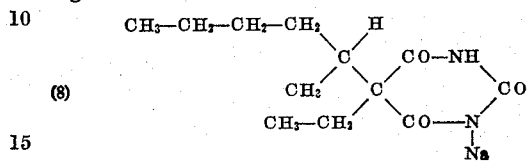

2. Sodium n-propyl-ethyl-carbinyl ethyl barbiturate may be prepared analogously, either in hydrated or in stable anhydrous form as desired. It is a white solid, soluble in water and alcohol and insoluble in ether. It is bitter tasting, and its aqueous solution is alkaline in reaction. It may be represented by the following formula:

(9) 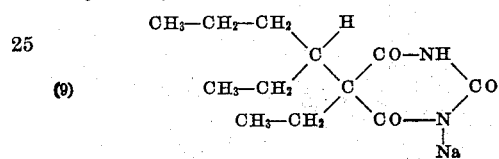

B. *Ammonium salts*.—One molar proportion of either of the above-described 5,5-di-aliphatic-substituted barbituric acids may be dissolved in or added to somewhat more than a molar proportion of concentrated aqueous ammonia solution, and the resultant ammonium salt crystallizes out or is concentrated to solid form. The formulas of those ammonium salts correspond in general to Formulas 8 and 9, save that $NH_4$ is substituted for Na.

C. *Amine salts*.—One molar proportion of either of the above-described 5,5-di-aliphatic-substituted barbituric acids is added to somewhat more than a molar proportion of an organic base, such as mono- or di-methyl amine or mono- or di-ethyl amine, in aqueous or alcoholic solution if desired or necessary. The amount of liquid used should be sufficient to ensure complete reaction. The resulting alkyl-substituted-ammonium barbiturate crystallizes out or is concentrated to solid form. The formulas of such organic-base barbiturates correspond in general to Formulas 8 and 9, save that the substituted-ammonium radical, such for instance as the methyl-ammonium radical, —$NH_3CH_3$, takes the place of Na.

The above-described di-aliphatic-substituted barbituric acids and their salts are all of value as sedatives and hypnotics.

I claim as my invention:

1. A barbituric compound which is represented by the following formula:

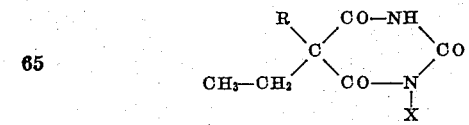

in which R represents a secondary-hexyl radical of the class consisting of the n-butyl-methyl-carbinyl and n-propyl-ethyl-carbinyl groups; and X represents either hydrogen, an alkali metal, ammonium, or a mono- or di-alkyl-substituted ammonium.

2. A barbituric acid which is represented by the following formula:

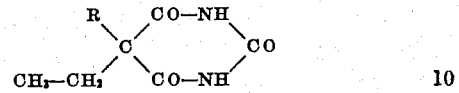

in which R represents a secondary-hexyl radical of the class consisting of the n-butyl-methyl-carbinyl and n-propyl-ethyl-carbinyl groups.

3. A sodium barbiturate which is represented by the following formula:

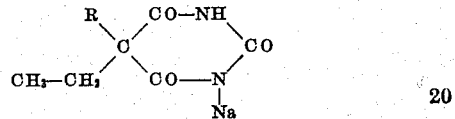

in which R represents a secondary-hexyl radical of the class consisting of the n-butyl-methyl-carbinyl and n-propyl-ethyl-carbinyl groups.

4. A barbituric compound which is represented by the following formula:

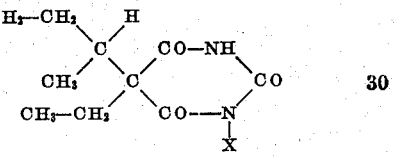

in which X represents either hydrogen, an alkali metal, ammonium, or a mono- or di-alkyl-substituted ammonium.

5. A barbituric compound which is represented by the following formula:

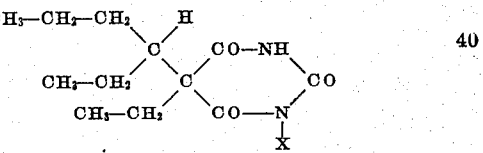

in which X represents either hydrogen, an alkali metal, ammonium, or a mono- or di-alkyl-substituted ammonium.

6. A barbituric acid which is represented by the following formula:

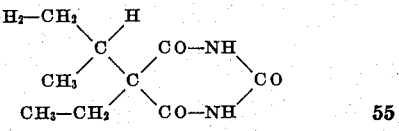

which is a white crystalline solid, having hypnotic action, insoluble in water, and soluble in alcohol.

7. A barbituric acid which is represented by the following formula:

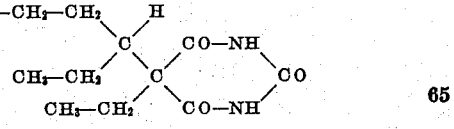

which is a white crystalline solid, having hypnotic action, insoluble in water, and soluble in alcohol.

HORACE A. SHONLE.